(12) United States Patent
Cho et al.

(10) Patent No.: US 8,848,786 B2
(45) Date of Patent: Sep. 30, 2014

(54) METHOD, MEDIUM, AND APPARATUS FOR ENCODING AND/OR DECODING VIDEO OF GENERATING A SCALABLE BITSTREAM SUPPORTING TWO BIT-DEPTHS

(75) Inventors: Dae-sung Cho, Seoul (KR); Dae-hee Kim, Suwon-si (KR); Woong-il Choi, Hwaseong-si (KR); Jae-woo Jung, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1044 days.

(21) Appl. No.: 12/155,832

(22) Filed: Jun. 10, 2008

(65) Prior Publication Data
US 2009/0003437 A1    Jan. 1, 2009

(30) Foreign Application Priority Data

Jun. 28, 2007  (KR) .................... 10-2007-0064602

(51) Int. Cl.
| | | |
|---|---|---|
| H04B 1/66 | (2006.01) | |
| H04N 19/61 | (2014.01) | |
| H04N 19/70 | (2014.01) | |
| H04N 19/36 | (2014.01) | |
| H04N 19/186 | (2014.01) | |
| H04N 19/46 | (2014.01) | |
| H04N 19/30 | (2014.01) | |
| H04N 19/126 | (2014.01) | |
| H04N 19/184 | (2014.01) | |

(52) U.S. Cl.
CPC ... *H04N 19/00315* (2013.01); *H04N 19/00781* (2013.01); *H04N 19/00884* (2013.01); *H04N 19/00448* (2013.01); *H04N 19/00545* (2013.01); *H04N 19/00424* (2013.01); *H04N 19/00096* (2013.01); *H04N 19/00309* (2013.01)
USPC .................................................. 375/240.03

(58) Field of Classification Search
CPC ............................................. H04N 19/00781
USPC ............................. 375/240.01, 240.03
IPC ........................................................ H04N 11/02
See application file for complete search history.

(56) References Cited

U.S. PATENT DOCUMENTS

| | | | |
|---|---|---|---|
| 6,917,713 B2 | 7/2005 | Ye et al. | |
| 7,145,948 B2 | 12/2006 | Ye et al. | |

(Continued)

FOREIGN PATENT DOCUMENTS

| | | |
|---|---|---|
| JP | 2004-112808 | 4/2004 |
| KR | 10-2005-0112588 | 12/2005 |

(Continued)

OTHER PUBLICATIONS

PCT Search Report issued on Nov. 20, 2008 in corresponding PCT Patent Application PCT/KR2008/003557.
European Office Action issued May 13, 2013 in corresponding European Application No. 08766516.2.

(Continued)

*Primary Examiner* — Jay Au Patel
*Assistant Examiner* — Yulin Sun
(74) *Attorney, Agent, or Firm* — Staas & Halsey LLP

(57) ABSTRACT

A method, medium, and apparatus for encoding and/or decoding video by generating a scalable bitstream supporting at least two bit-depths with forward compatibility, wherein the scalable bitstream comprises a base layer bitstream including a base quantization level and a base quantization parameter corresponding to a base bit-depth, and an enhancement layer bitstream including residue between an extended quantization level and a compensated quantization level that is predicted from the base quantization level, and a refined quantization parameter for refining the difference between an extended bit-depth and the base bit-depth.

24 Claims, 10 Drawing Sheets

(56) References Cited

U.S. PATENT DOCUMENTS

| | | |
|---|---|---|
| 8,194,748 B2 | 6/2012 | Kim |
| 2004/0101052 A1 | 5/2004 | Roh |
| 2005/0094726 A1* | 5/2005 | Park .................. 375/240.08 |
| 2005/0259729 A1 | 11/2005 | Sun |
| 2006/0257034 A1* | 11/2006 | Gish et al. ................ 382/239 |
| 2007/0047644 A1* | 3/2007 | Lee et al. ................. 375/240.1 |
| 2010/0020866 A1* | 1/2010 | Marpe et al. ........... 375/240.02 |

FOREIGN PATENT DOCUMENTS

| | | |
|---|---|---|
| WO | 2006/004331 A1 | 1/2006 |
| WO | 2006/006835 A1 | 1/2006 |
| WO | 2006/099221 A2 | 9/2006 |

OTHER PUBLICATIONS

Japanese Office Action issued Feb. 14, 2012 in corresponding Japanese Patent Application No. 2010-514609.

European Search Report dated Nov. 18, 2011 issued in corresponding European Patent Application No. 08766516.2.

Peter D. Symes, "Ten-Bit Processing in an 8-Bit Environment", SMPTE Journal, Jun. 1989, pp. 444-446.

Martin Winken et al., "Bit-depth Scalability in SVC", Meeting of the Joint Video Team of the ISO/IEC, No. JVT-V078, Jan. 2007, pp. 1-10.

Barry G. Haskell et al., "Digital Video: An Introduction to MPEG-2", Digital Multimedia Standard Series, Jan. 1999, pp. 183-202.

"Joint Draft 8: Scalable Video Coding", Draft of the Joint Video Team of the ISO/IEC, Nov. 2006, pp. 58-59.

Peter Amon et al., "SNR Scalable Layered Video Coding", International Workshop on Packet Video, Apr. 2004, pp. 1-8.

* cited by examiner

FIG. 4

| Start-CODE Suffix | BDU Type | |
|---|---|---|
| 0x00 | SMPTE Reserved | (451) |
| 0x01-0x09 | SMPTE Reserved | (452) |
| 0x0A | end-of-Sequence | (411) |
| 0x0B | Slice | (412) |
| 0x0C | Field | (413) |
| 0x0D | Frame | (414) |
| 0x0E | Entry-point Header | (415) |
| 0x0F | Sequence Header | (416) |
| 0x10-0x1A | SMPTE Reserved | (453) |
| 0x1B | Slice Level User Data | (417) |
| 0x1C | Field Level User Data | (418) |
| 0x1D | Frame Level User Data | (419) |
| 0x1E | Entry-point Level User Data | (420) |
| 0x1F | Sequence Level User Data | (421) |
| 0x20-40, 0x41-0x7F | SMPTE Reserved | (454) |
| 0x80-0xFF | Forbidden | (422) |

METHOD, MEDIUM, AND APPARATUS FOR ENCODING AND/OR DECODING VIDEO OF GENERATING A SCALABLE BITSTREAM SUPPORTING TWO BIT-DEPTHS

CROSS-REFERENCE TO RELATED APPLICATIONS

This application claims the benefit of Korean Patent Application No. 10-2007-0064602, filed on Jun. 28, 2007, in the Korean Intellectual Property Office, the disclosure of which is incorporated herein in its entirety by reference.

BACKGROUND

1. Field

One or more embodiments of the present invention relates to a method, medium and apparatus for encoding and/or decoding video, and more particularly, to a method, medium and apparatus for encoding and/or decoding video in which a scalable bitstream supporting at least two bit-depths with forward compatibility is generated or decoded.

2. Description of the Related Art

In an ordinary video codec according to conventional technology, when the bit-depth of a basic encoder such as a VC-1 encoder, is changed from 8 bits to 10 bits, it is impossible for a VC-1 decoder to read and reproduce a bitstream which is generated from the improved encoders having the extended bit-depth. Recently, the necessity for development of a video codec which guarantees forward compatibility and then allows a VC-1 decoder and other improved decoders to restore a bitstream encoded with a variety of bit-depths as well as the fixed bit-depth, has been increasingly highlighted.

That is, since a new video codec which does not guarantee forward compatibility cannot support a terminal having only a conventional basic video codec, reuse of digital content in both terminals having specifications different from each other becomes impossible. In addition, it will take much time for the new video codec to settle into the market, because the new video codec needs to overcome the already established conventional video codec market.

SUMMARY

One or more embodiments of the present invention provides a video encoding apparatus and method by which a scalable bitstream supporting at least two bit-depths with forward compatibility is generated.

One or more embodiments of the present invention also provides a video decoding apparatus and method for decoding a bitstream supporting at least two bit-depths with forward compatibility.

Additional aspects and/or advantages will be set forth in part in the description which follows and, in part, will be apparent from the description, or may be learned by practice of the invention.

According to an aspect of the present invention, there is provided a video encoding method of generating a scalable bitstream supporting at least two bit-depths with forward compatibility, wherein the scalable bitstream includes: a base layer bitstream including a base quantization level and a base quantization parameter corresponding to a base bit-depth; and an enhancement layer bitstream including residue between an extended quantization level and a compensated quantization level that is predicted from the base quantization level, and a refined quantization parameter for refining the difference between an extended bit-depth and the base bit-depth.

According to another aspect of the present invention, there is provided a video encoding apparatus for generating a scalable bitstream supporting at least two bit-depths with forward compatibility, the video encoding apparatus including: a base layer encoding unit to generate a base layer bitstream including a base quantization level and a base quantization parameter corresponding to a base bit-depth; an enhancement layer encoding unit to generate an enhancement layer bitstream including residue between an extended quantization level and a compensated quantization level that is predicted from the base quantization level, and a refined quantization parameter for refining the difference between an extended bit-depth and the base bit-depth; and a bitstream combining unit to combine the base layer bitstream and the enhancement layer bitstream to generate the scalable bitstream.

According to another aspect of the present invention, there is provided a video decoding method including: checking whether a bitstream contains an enhancement layer identifier; if the bitstream does not contain the enhancement layer identifier, generating a restored video having a base bit-depth by directly decoding the bitstream; and if the bitstream contains the enhancement layer identifier, generating a restored video having an extended bit-depth by obtaining a base quantization level of a base layer from a base layer bitstream of the bitstream, and then decoding a residue between an extended quantization level and a compensated quantization level that is predicted from the base quantization level, and a refined quantization parameter for refining the difference between an extended bit-depth and the base bit-depth, and by adding the residue to the compensated quantization level.

According to another aspect of the present invention, there is provided a video decoding apparatus including: a base layer decoding unit to decode a base layer bitstream including a base quantization level and a base quantization parameter corresponding to a base bit-depth and to obtain a base restored video; and an enhancement layer decoding unit to decode an enhancement layer bitstream including residue between an extended quantization level and a compensated quantization level that is predicted from the base quantization level, and a refined quantization parameter for refining the difference between an extended bit-depth and the base bit-depth, and to obtain an extended restored video by adding a compensated quantization level predicted from a restored base quantization level to the residue.

According to another aspect of the present invention, there is provided a video decoding method including checking whether a bitstream contains an enhancement layer identifier; and sending the bitstream to a decoder for decoding if the bitstream does not contain the enhancement layer identifier; and by extracting a base layer bitstream from the bitstream and sending the base layer bitstream to the decoder if the bitstream contains the enhancement layer identifier.

According to another aspect of the present invention, there is provided a video decoding method including: checking whether a bitstream contains an enhancement layer identifier; and decoding adaptively based on the resulting the checking.

According to another aspect of the present invention, there is provided a computer readable medium having computer readable code to implement a video encoding method of generating a scalable bitstream supporting at least two bit-depths with forward compatibility, wherein the scalable bitstream includes: a base layer bitstream including a base quantization level and a base quantization parameter corresponding to a base bit-depth; and an enhancement layer bitstream including residue between an extended quantization level and a compensated quantization level that is predicted from the base quantization level, and a refined quantization parameter for refining the difference between an extended bit-depth and the base bit-depth.

According to another aspect of the present invention, there is provided a computer readable medium having computer readable code to implement a video decoding method including: checking whether a bitstream contains an enhancement layer identifier; if the bitstream does not contain the enhancement layer identifier, generating a restored video having a base bit-depth by directly decoding the bitstream; and if the bitstream contains the enhancement layer identifier, generating a restored video having an extended bit-depth by obtaining a base quantization level of a base layer from a base layer bitstream of the bitstream, and then decoding a result of adding a compensated quantization level of an enhancement layer that is predicted from the base quantization level to an extended quantization level of the enhancement layer.

BRIEF DESCRIPTION OF THE DRAWINGS

These and/or other aspects and advantages will become apparent and more readily appreciated from the following description of the embodiments, taken in conjunction with the accompanying drawings of which:

FIG. 4 is a diagram illustrating an example of a start code which is an interval for loading an enhancement layer identifier in a video encoding apparatus, according to an embodiment;

DETAILED DESCRIPTION OF THE EMBODIMENTS

Figure 1:
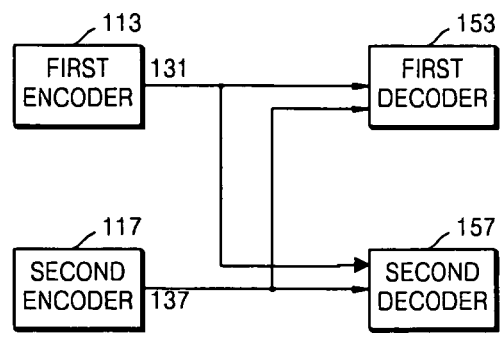
FIG. 1 is a diagram explaining concepts of a video encoding apparatus and video decoding apparatus, according to an embodiment of the present invention.

Reference will now be made in detail to embodiments, examples of which are illustrated in the accompanying drawings, wherein like reference numerals refer to the like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 is a diagram explaining concepts of a video encoding apparatus and video decoding apparatus, according to an embodiment of the present invention. As an encoder part, examples of a first encoder 113 performing the role of a basic encoder and a second encoder 117 performing the role of an improved encoder will be explained. As a decoder part, examples of a first decoder 153 performing the role of a basic decoder and corresponding to the first encoder 113, and a second decoder 157 performing the role of an improved decoder and corresponding to the second encoder 117 will be explained. In an embodiment of the present invention, the first encoder 113 generates a bitstream according to a base bit-depth, and the second encoder 117 generates a scalable bitstream according to an extended bit-depth supporting the base bit-depth.

For convenience of explanation, an example will be given, in which a base bit-depth is 8 bits, and an extended bit-depth is 10 bits. According to the example, a VC-1 encoder supporting 8 bits may be employed as the first encoder 113.

Referring to FIG. 1, a bitstream 131 generated in the first encoder 113 can be decoded in the second decoder 157 as well as in the first decoder 153. A scalable bitstream 137 generated in the second encoder 117 can be decoded in the second decoder 157. In the first decoder 153, a base layer bitstream in the scalable bitstream 137 can be decoded in a state in which an enhancement layer bitstream included in the scalable bitstream 137 is ignored. The second encoder 117 which is capable of providing this forward compatibility corresponds to a video encoding apparatus of the present invention, while the second decoder 157 corresponds to a video decoding apparatus according to an embodiment of the present invention.

Figure 2:
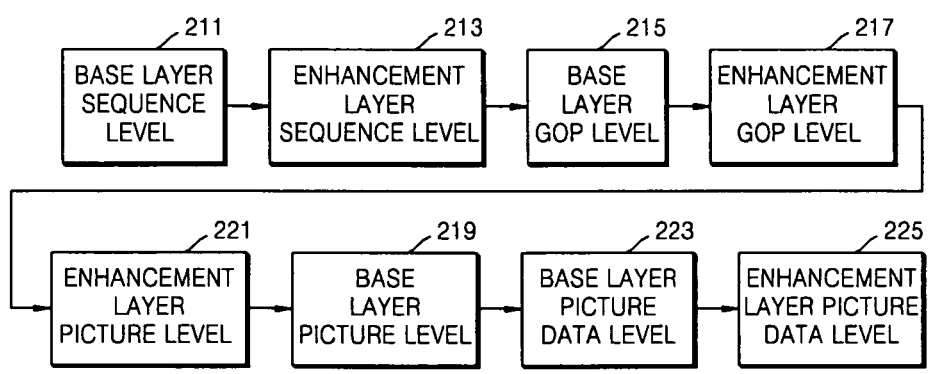
FIG. 2 is a diagram illustrating an example of syntax of a scalable bitstream which is obtained from a video encoding apparatus, according to an embodiment.

FIG. 2 is a diagram illustrating an example of syntax of a scalable bitstream which is obtained from a video encoding apparatus according to an embodiment of the present invention. The syntax is composed of a base layer bitstream and an enhancement layer bitstream.

More specifically, the scalable bitstream illustrated in FIG. 2 is composed of a base layer sequence level 211, an enhancement layer sequence level 213, a base layer group of pictures (GOP) level 215, an enhancement layer GOP level 217, an enhancement layer picture level 219, a base layer picture level 221, a base layer picture data level 223, and an enhancement layer picture data level 225. Although the enhancement layer picture level 219 is positioned in front of the base layer picture level 221 in this case, the enhancement layer picture level 219 may be positioned behind the base layer picture level 221. The base layer GOP level 215 and the enhancement layer GOP level 217 can be optionally included in the scalable bitstream.

Here, a sequence is formed with at least one or more encoded pictures or at least one or more GOPs. A GOP is formed with at least one or more encoded pictures, and in the case of a VC-1 codec, an entry-point may be used. Here, the first picture in each GOP can provide a random access function. Meanwhile, a picture is divided into a plurality of macroblocks, and if the video format is 4:2:0, each macroblock is formed of 4 luminance blocks and 2 chrominance blocks.

FIGS. 3A through 3D are diagrams illustrating examples of information included in each level illustrated in FIG. 2 according to an embodiment of the present invention.

Figure 3A:
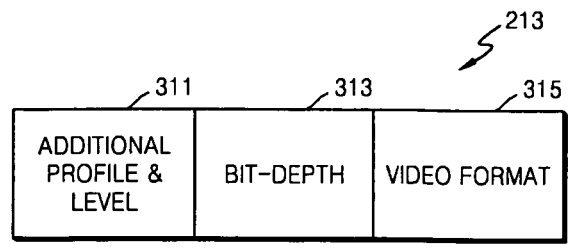
FIGS. 3A through 3D are diagrams illustrating examples of information included in each level illustrated in FIG. 2, according to an embodiment.
Figure 3B:
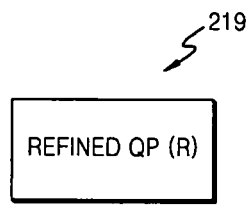

FIG. 3A illustrates information included in the enhancement layer sequence level 213, and includes an additional profile and level 311 which can be supported in an enhancement layer, and a bit-depth 313 which the enhancement layer can support. Here, if a video format 315 can be defined in the base layer sequence level 211, the video format 315 does not have to be included in the enhancement layer sequence level 213. FIG. 3B illustrates information included in the enhancement layer picture level 219, and includes a refined quantization parameter (QP) (R) for refining the difference between a base bit-depth and an extended bit-depth, in consideration of the extended bit-depth that cannot be expressed in the base layer.

Figure 3C:
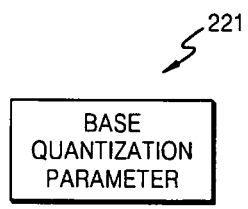
Figure 3D:
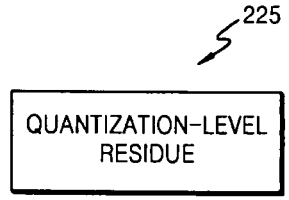

FIG. 3C illustrates information included in the base layer picture level 221, and includes a base quantization parameter of the first encoder 113. FIG. 3D illustrates information included in the enhancement layer picture data level 225, and indicates residue of an extended quantization parameter of an enhancement layer that is obtained by prediction from a base quantization parameter of a base layer.

FIG. 4 is a diagram illustrating areas for loading information related to an enhancement layer, including an enhancement layer identifier, in a scalable bitstream obtained from a video encoding apparatus according to an embodiment of the present invention. If the first encoder 113 is a VC-1 encoder, a start code of a 4-byte unit may be used in an embodiment of the present invention. In the VC-1 encoder, a start code can be supported at an advanced profile or a profile higher than the advanced profile. Meanwhile, the start code may be included in the first area of the header of each level.

A process of loading information related to an enhancement layer in a start code of the VC-1 used as an embodiment of the present invention will now be explained with reference to FIG. 4. Among bitstream data unit (BDU) types defined in a suffix in a start code, reserved areas 451, 452, 453, and 454 reserved for future use are used for loading information related to the enhancement layer. Here, the BDU means a compression data unit that can be parsed independently of other information items in an identical layer level. For example, the BDU may be a sequence header, an entry point header, an encoded picture or a slice. Among the BDU types defined in the suffix of the start code, the remaining areas 411 through 421, excluding a forbidden area 422, are for loading information related to a base layer. Here, the start code is only an example, and other parts in the elements of a bitstream may also be used.

Meanwhile, an enhancement layer includes a sequence level, a GOP level, a frame level, a field level, and a slice level. According to an embodiment of the present invention, information of the enhancement layer may be included in one of the second reserved area 452 and the fourth reserved area 454. More specifically, a start code is included in a header for a sequence level of the enhancement layer as '0x09' in the second reserved area 452 or '0x40' in the fourth reserved area 454. A start code is included in a header for a GOP level of the enhancement layer as '0x08' in the second reserved area 452 or '0x3F' in the fourth reserved area 454. A start code is included in a header for a frame level of the enhancement layer as '0x07' in the second reserved area 452 or '0x3E' in the fourth reserved area 454. A start code is included in a header for a field level of the enhancement layer as '0x06' in the second reserved area 452 or '0x3D' in the fourth reserved area 454. A start code for enhancement chrominance data is included in a header for enhancement layer data as '0x06' in the second reserved area 452 or '0x3C' in the fourth reserved area 454.

This will now be explained in more detail.

Examples of Information items that can be included in the start code of the header for the enhancement layer sequence level which is defined as '0x09' in the second reserved area 452 include information on an additional profile and level that can be achieved by the enhancement layer in addition to a base layer, and information on a bit-depth. More specifically, in the sequence level of the base layer, a profile is defined by 2 bits, and '3' indicates an advanced profile and '0-2' indicates a reserved area. Meanwhile, a level is defined by 3 bits, '000' indicates AP@L0, '001' indicates AP@L1, '010' indicates AP@L2, '011' indicates AP@L3, '100' indicates AP@L4, and '101-111' indicates a reserved area. Information on a bit-depth that can be achieved by the enhancement layer can be expressed by a value from "N–8" (where N is an extended bit-depth). According to a base bit-depth of the first encoder 113 illustrated in FIG. 1 corresponding to the base layer, a value other than 8 can be used. Meanwhile, as information on the enhancement layer, information on an extended video format may be included. The video format information may be expressed by using a variable included in the sequence level of the base layer, for example, in the case of the VC-1 encoder, a 'COLORDIFF' variable. The video format information may also be included in '0x09' in the second reserved area 452. If a variable of the base layer is used, the enhancement layer does not have to transmit the information of the extended video format separately. In the example of the 'COLORDIFF' variable, '1' is used for defining a 4:2:0 video format, and '2' and '3' are specified as reserved areas. Accordingly, the variable can be used for defining a 4:2:2 video format and a 4:4:4 video format. Meanwhile, as information on the enhancement layer, an additional hypothetical reference decoder (HRD) variable may be included. The HRD variable is a virtual video buffer variable which a decoder refers to for operating a buffer.

If a bit-depth or a video format does not change in units of GOPs, the start code of the header for the enhancement layer GOP level which is defined as '0x08' in the second reserved area 452 is not necessary, and is designated as a reserved area. If the bit-depth or video format is changed in units of GOPs, the start code is necessary.

The start code for the header of the picture level, i.e., a frame level and a field level, of the enhancement layer which is defined as '0x07' and '0x06' in the second reserved area 452, includes a refined QP (R) for indicating the remaining bit-depth of the enhancement layer that cannot be expressed by the base layer according to progressive or interlaced scanning. In an embodiment of the present invention, the start code includes a refined QP (R) for 'N–8' (where N is the bit-depth of the second encoder 117) when the bit-depth of the first encoder 113 is 8 bits. In this case, since the refined QP (R) is used in units of pictures, the refined QP (R) is included in the picture level. However, another embodiments of the present invention, when a refined QP (R) is used in units of slices, the refined QP (R) is included in the slice level, when a refined QP (R) is used in units of macroblocks, the refined QP (R) is included in the macroblock level, and when a refined QP (R) is used in units of blocks, the refined QP (R) is included in the block level. In order to calculate a refined QP (R) for each macroblock or block, a process for calculating a refined QP (R) of a picture level which will be explained later can be applied.

If the video format of the enhancement layer is not changed in comparison with the base layer, the start code for the header of the enhancement layer data which is defined as '0x05' in the second reserved area 452 is not necessary, and therefore is designated as a reserved area. If the video formats of the base layer and the enhancement layer are identically 4:2:0, data for 4 luminance blocks and 2 chrominance blocks forming one macroblock are transmitted from the base layer. Meanwhile, when the video formats of the base layer and the enhancement layer are different from each other, for example, when the video format of the base layer is 4:2:0 and the video format of the enhancement layer is 4:2:2 or when the video format of the base layer is 4:2:0 and the video format of the enhancement layer is 4:4:4, data for 4 luminance blocks and 2 chrominance blocks are transmitted from the base layer, and at the same time, data for a chrominance residue block corresponding to the video format is transmitted from the enhancement layer so that the extended video format can be supported. Meanwhile, data for 4 luminance blocks are identical irrespective of the video formats, and the enhancement layer does not have to transmit separate data.

Meanwhile, information related to the enhancement layer is not restricted to the start codes described in FIG. 4, and can be included in a reserved area which is reserved for future use in a sequence level, a GOP level, a picture level, a macroblock level or a block level. Also, an enhancement layer identifier can be included in a variety of ways in a variety of layers of a network protocol or a system layer for loading and packaging a video bitstream as a payload in order to transmit the bitstream.

Next, a process of obtaining a scalable bitstream when a bit-depth among a plurality of coding parameters is extended will be explained with reference to FIG. 1.

In an example in which the first encoder 113 is an 8-bit encoder and the second encoder 117 is an N-bit encoder, the start code of the picture level of the enhancement layer bitstream in a scalable bitstream obtained from the second encoder 117 is used to express the remaining part of an extended bit-depth that cannot be expressed by the first encoder 113. For example, it is assumed that the extended bit-depth is N bits and the extended quantization parameter in this case is $QP_N$ and the base bit-depth is 8 bits and the base quantization parameter in this case is $QP_8$. If N-bit original video, i.e. an original video having a bit-depth of N bits is encoded by an 8-bit video codec, i.e. a video codec having a bit-depth of 8 bits, the relationship between the two quantization parameters $QP_N$ and $QP_8$ can be expressed as follows:

$$QP_N = QP_8 \times 2^{(N-8)} \quad (1)$$

That is, the result of quantizing the N-bit original video using the extended quantization parameter $QP_N$ and the result of quantizing the 8-bit original video using the base quantization parameter $QP_8$ must be the same in terms of dynamic range, so that the N-bit original video can be encoded and decoded using a conventional method without changing video codecs. However, in this case, the quality of video restored from the N-bit original video is not greatly different from that of video restored from the 8-bit original video, thus invalidating the advantage of the N-bit original video that provides a high contrast ratio.

In order to rectify this problem, the N-bit original video can be expressed using the base quantization parameter $QP_8$ and the refined quantization parameter R, as disclosed in the following Equation (2). Here, in the case of the VC-1 encoder, the extended quantization parameter $QP_N$ or the base quantization parameter $QP_8$ are derived from 'PQINDEX'.

$$QP_N = QP_8 \times 2^{(N-8)} + R \quad (2)$$

The refined quantization parameter R can be calculated by using the following Equation (3) based on Equation (2):

$$R = QP_N - QP_8 \times 2^{(N-8)} \quad (3)$$

A base layer bitstream is formed of data obtained by quantizing the N-bit original video by using the base quantization parameter expressed in Equation (1). An enhancement layer bitstream is formed of data obtained by quantizing the N-bit original video by using the extended quantization parameter expressed in Equation (2). Then a scalable bitstream is obtained by including an enhancement layer identifier into these bitstreams. The scalable bitstream can be decoded by not only the existing 8-bit decoder but also by an N-bit decoder.

Figure 5:
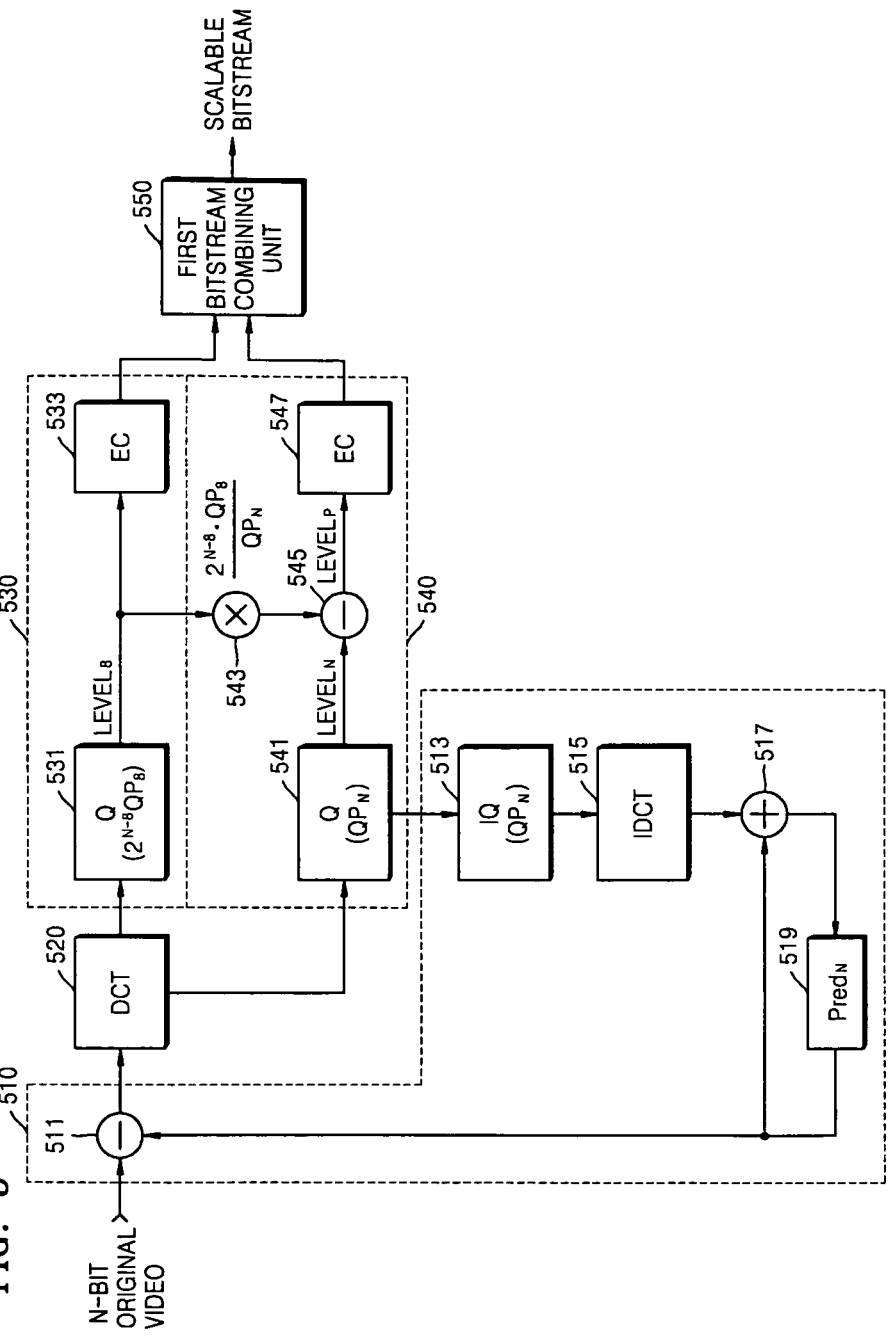
FIG. 5 is a block diagram illustrating a structure of a video encoding apparatus, according to an embodiment.

FIG. 5 is a block diagram of a video encoding apparatus according to an embodiment of the present invention. The video encoding apparatus may include a first residue generation unit 510, a first transformation unit 520, a first base layer encoding unit 530, a first enhancement layer encoding unit 540, and a first bitstream combining unit 550. The first residue generation unit 510 may include a first subtraction unit 511, a first inverse quantization unit 513, a first inverse transformation unit 515, a first addition unit 517, and a first prediction unit 519. The first base layer encoding unit 530 may include a first quantization unit 531 and a first entropy encoding unit 533. The first enhancement layer encoding unit 540 may include a second quantization unit 541, a first multiplication unit 543, a second subtraction unit 545, and a second entropy encoding unit 547. The first residue generation unit 510, the first transformation unit 520, the first base layer encoding unit 530, the first enhancement layer encoding unit 540, and the first bitstream combining unit 550 may be implemented by using at least one processor (not shown).

Referring to FIG. 5, the first residue generation unit 510 generates residue between the N-bit original video and N-bit restored video that is obtained by performing temporal/spatial prediction on N-bit reference video. The residue can be generated using a well-known process of compressing various videos and thus a detailed description thereof will be omitted.

The first transformation unit 520 generates transform coefficients by transforming the residue received from the first residue generation unit 510. For example, discrete cosine transformation (DCT) is performed in order to obtain the transform coefficients.

The first base layer encoding unit 530 generates a base layer bitstream by quantizing the transform coefficients received from the first transformation unit 520 using the base quantization parameter expressed in Equation (1), and then entropy encoding the quantized transform coefficients, i.e. a base quantization level of a base layer. In detail, if the transform coefficients are coef, the base quantization level $LEVEL_8$ of the base layer can be calculated by:

$$LEVEL_8 = \frac{abs(coef) + QP_8 \times 2^{(N-9)}}{QP_8 \times 2^{(N-8)}} \quad (4)$$

The base quantization level $LEVEL_8$ of the base layer calculated by using Equation (4) is directly entropy encoded so that it can be restored by the existing 8-bit video codec.

The first enhancement layer encoding unit 540 generates an enhancement layer bitstream by quantizing the transform coefficients received from the first transformation unit 520 using the extended quantization parameter expressed in Equation (2) and then entropy encoding the quantized transform coefficients, i.e. an extended quantization level of an enhancement layer. In detail, if the transform coefficients are coef, the extended quantization level $LEVEL_N$ of the enhancement layer can be calculated by:

$$LEVEL_N = \frac{\text{abs}(coef) + QP_N/2}{QP_N} \quad (5)$$

The extended quantization level $LEVEL_N$ of the enhancement layer calculated by using Equation (5) is not directly entropy encoded, and instead, residue of the extended quantization level obtained by prediction encoding the base quantization level $LEVEL_8$ of the base layer is entropy encoded. That is, since the base quantization level $LEVEL_8$ of the base layer and the extended quantization level $LEVEL_N$ of the enhancement layer are fairly similar to each other, the residue of the extended quantization level of the enhancement layer is obtained by predicting the extended quantization level from the base quantization level $LEVEL_8$ of the base layer, using the first multiplication unit 543 and the second subtraction unit 545. In detail, the first multiplication unit 543 which is used to compensate for the dynamic range of a quantization level, equalizes the dynamic range of the base quantization level $LEVEL_8$ of the base layer with the dynamic range of the extended quantization level $LEVEL_N$ of the enhancement layer by using the following Equation (6), and then outputs a compensated quantization level $LEVEL_N'$ of the enhancement layer.

$$LEVEL_N' = \left\lfloor \frac{QP_8 \times 2^{(N-8)}}{QP_N} \times LEVEL_8 \right\rfloor \quad (6)$$

The second subtraction unit 545 generates quantization-level residue $LEVEL_P$ by calculating the difference between the extended quantization level $LEVEL_N$ and the compensated quantization level $LEVEL_N'$ of the enhancement layer by using the following Equation (7):

$$LEVEL_P = LEVEL_N - LEVEL_N' \quad (7)$$

As described above, it is possible to significantly reduce the amount of data to be contained in the enhancement layer bitstream by entropy encoding the quantization-level residue $LEVEL_P$ of the enhancement layer.

The first bitstream combining unit 550 generates a scalable bitstream by combining the base layer bitstream and the enhancement layer bitstream and including an enhancement layer identifier in the combined result.

Accordingly, the above-described video encoding apparatus can achieve forward compatibility.

Figure 6:
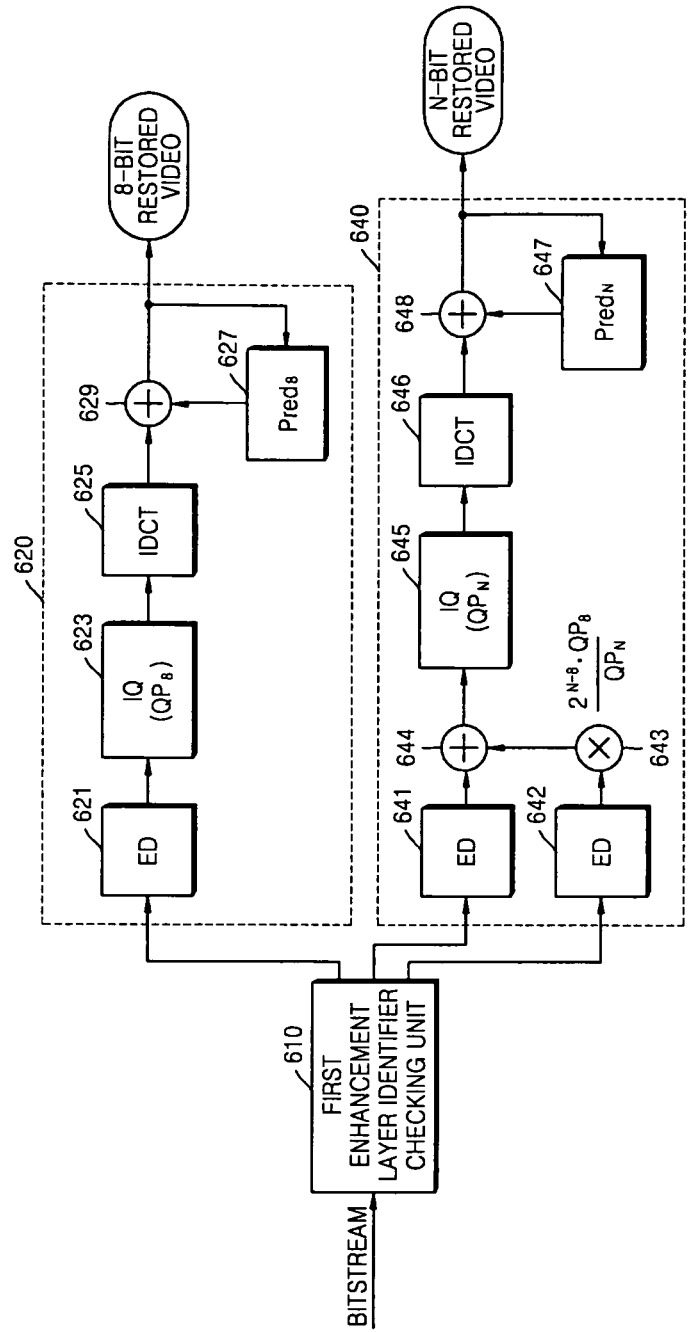
FIG. 6 is a block diagram illustrating a structure of a video decoding apparatus, according to an embodiment.

FIG. 6 is a block diagram of a video decoding apparatus according to an embodiment of the present invention, which corresponds to the video encoding apparatus illustrated in FIG. 5. The video decoding apparatus may include a first enhancement layer identifier checking unit 610, a first base layer decoding unit 620, and a first enhancement layer decoding unit 640. The first base layer decoding unit 620 may include a first entropy decoding unit 621, a second inverse quantization unit 623, a second inverse transformation unit 625, a second prediction unit 627 and a second addition unit 629. The first enhancement layer decoding unit 640 may include a second entropy decoding unit 641, a third entropy decoding unit 642, a second multiplication unit 643, a third addition unit 644, a third inverse quantization unit 645, a third inverse transformation unit 646, a third prediction unit 647 and a fourth addition unit 648. The first enhancement layer identifier checking unit 610, the first base layer decoding unit 620, and the first enhancement layer decoding unit 640 may be implemented by using at least one processor (not shown).

Referring to FIG. 6, the first enhancement layer identifier checking unit 610 checks whether a bitstream contains an enhancement layer identifier and then directly provides the bitstream, i.e. the base layer bitstream, to the first base layer decoding unit 620 if the bitstream does not contain the enhancement layer identifier. If the bitstream contains the enhancement layer identifier, the first enhancement layer identifier checking unit 610 separates an enhancement layer bitstream and a base layer bitstream from the bitstream, i.e. the scalable bitstream and then respectively transmits them to the second entropy decoding unit 641 and the third entropy decoding unit 642 of the first enhancement layer decoding unit 640.

The first base layer decoding unit 620 decodes the base layer bitstream received from the first enhancement layer identifier checking unit 610 in order to obtain 8-bit restored video. In detail, transform coefficients $coef_8$ are restored by multiplying the base quantization level $LEVEL_8$ of a base layer contained in the bitstream by a base quantization parameter $QP_8$, as follows:

$$coef_8 = LEVEL_8 \times QP_8 \quad (8)$$

The restored transform coefficients $coef_8$ are used to generate 8-bit restored video by restoring residue by performing inversion transformation, and then adding 8-bit restored video obtained by performing temporal/spatial prediction on 8-bit reference video to the restored residue.

The first enhancement layer decoding unit 640 decodes the base layer bitstream and the enhancement layer bitstream received from the first enhancement layer identifier checking unit 610 and then obtains N-bit restored video. Specifically, the restored base quantization level $LEVEL_8$ of the base layer is compensated for by using Equation (6) in order to obtain a compensated quantization level $LEVEL_N'$ of an enhancement layer. Then, a restored extended quantization level $LEVEL_N$ of the enhancement layer is obtained by adding the compensated quantization level $LEVEL_N'$ and restored quantization-level residue $LEVEL_P$ of the enhancement layer, as follows:

$$LEVEL_N = LEVEL_P + LEVEL_N' \quad (9)$$

Transform coefficients $coef_N$ are restored by using the restored extended quantization level $LEVEL_N$ of the enhancement layer and an extended quantization parameter $QP_N$, as follows:

$$coef_N = LEVEL_N \times QP_N \quad (10)$$

The restored transform coefficients $coef_N$ are used to generate a final N-bit restored video by restoring residue by performing inverse transformation and then adding N-bit restored video obtained by performing temporal/spatial prediction on N-bit reference video to the restored residue.

Figure 7A:
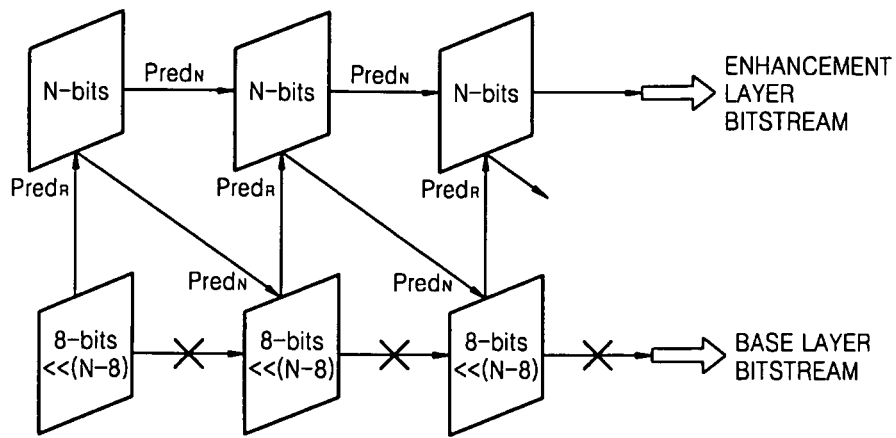
FIGS. 7A and 7B are diagrams illustrating an inter-layer prediction method or an intra-layer prediction method in the video encoding apparatus of FIGS. 5 and 6, according to an embodiment.
Figure 7B:
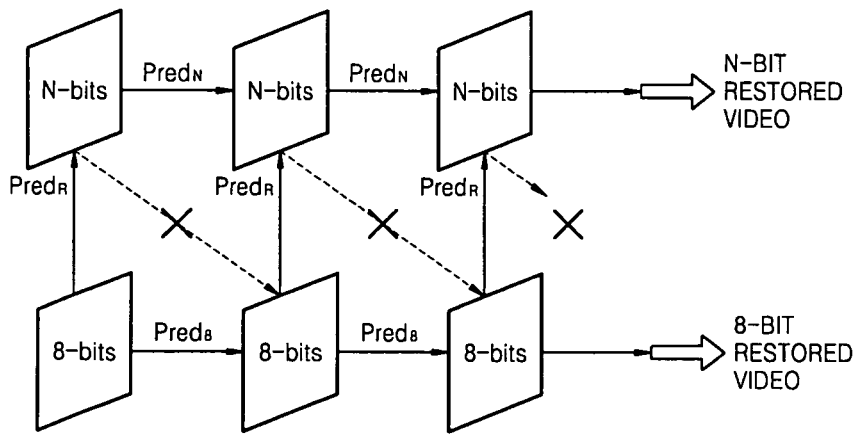

FIG. 7A is a diagram illustrating an inter-layer prediction method or an intra-layer prediction method using the video encoding apparatus illustrated in FIG. 5, according to an embodiment of the present invention. FIG. 7B is a diagram illustrating an inter-layer prediction method or an intra-layer prediction method using the video decoding apparatus illustrated in FIG. 6, according to an embodiment of the present invention.

Referring to FIGS. 7A and 7B, for efficient encoding of N-bit video, N-bit restored video is used as reference video on which temporal/spatial prediction is to be performed. In the case of 8-bit video, the encoding apparatus and the decoding apparatus use different reference videos in performing temporal/spatial prediction, and thus the quality of 8-bit restored video that a decoder finally obtains may deteriorate. However, encoding using a hierarchical structure as illustrated in FIG. 7A enables not only N-bit video to be restored but also the existing 8-bit video codec to be supported. Accordingly, in the quality of 8-bit restored video is not being deteriorated.

Figure 8:
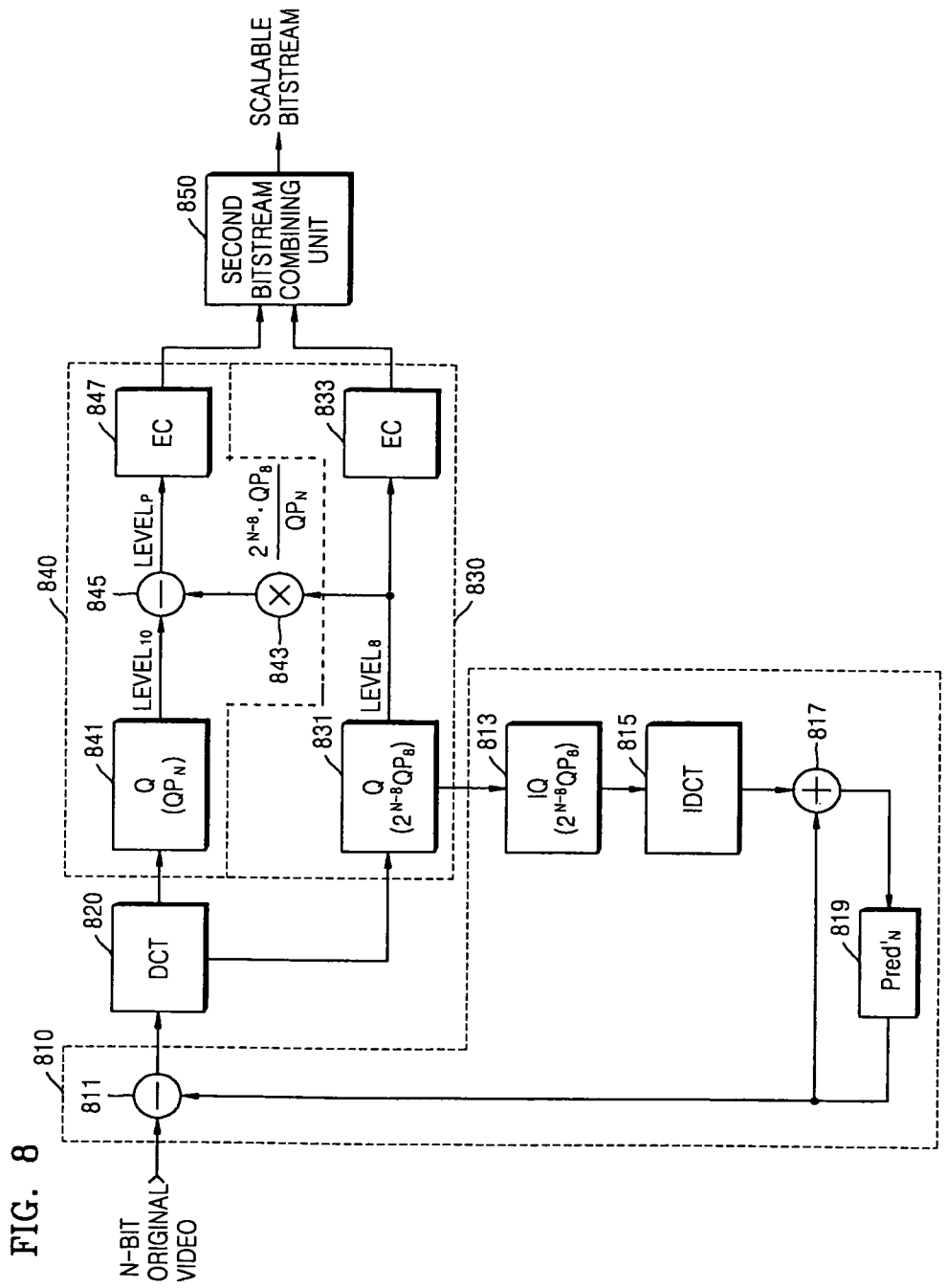
FIG. 8 is a block diagram illustrating a structure of a video encoding apparatus according to an embodiment.

FIG. 8 is a block diagram of a video encoding apparatus according to another embodiment of the present invention, which is capable of preventing the quality of 8-bit restored video from being deteriorated due to different reference videos that the encoding apparatus of FIG. 5 and the decoding apparatus of FIG. 6 use in performing temporal/spatial prediction. Referring to FIG. 8, the video encoding apparatus may include a second residue generation unit 810, a second transformation unit 820, a second base layer encoding unit 830, a second enhancement layer encoding unit 840, and a second bitstream combining unit 850. The second residue generation unit 810 may include a third subtraction unit 811, a fourth inverse quantization unit 813, a fourth inverse transformation unit 815, a fifth addition unit 817, and a fourth prediction unit 819. The second base layer encoding unit 830 may include a third quantization unit 831 and a third entropy encoding unit 833. The second enhancement layer encoding unit 840 may include a fourth quantization unit 841, a third multiplication unit 843, a fourth subtraction unit 845, and a fourth entropy encoding unit 847. The second residue generation unit 810, the second transformation unit 820, the second base layer encoding unit 830, the second enhancement layer encoding unit 840, and the second bitstream combining unit 850 may be implemented by using at least one processor (not shown).

Compared to the video encoding apparatus illustrated in FIG. 5, the video encoding apparatus illustrated in FIG. 8 performs quantization using an 8-bit quantization parameter, i.e., a base quantization parameter, in order to obtain restored video and then performs temporal/spatial prediction by using the restored video as reference video. Thus in this case of a base layer, i.e., 8-bit video, the encoding apparatus and the decoding apparatus use the same reference video in performing temporal/spatial prediction, thereby preventing the quality of restored 8-bit video that a decoder finally obtains from deteriorating. In the case of N-bit video, quantization is performed using an 8-bit quantization parameter in order to obtain restored video, and then temporal/spatial prediction is performed using the restored video as reference video. Therefore, the amount of data that is to be encoded may be larger than when using the video encoding apparatus illustrated in FIG. 5.

Figure 9:
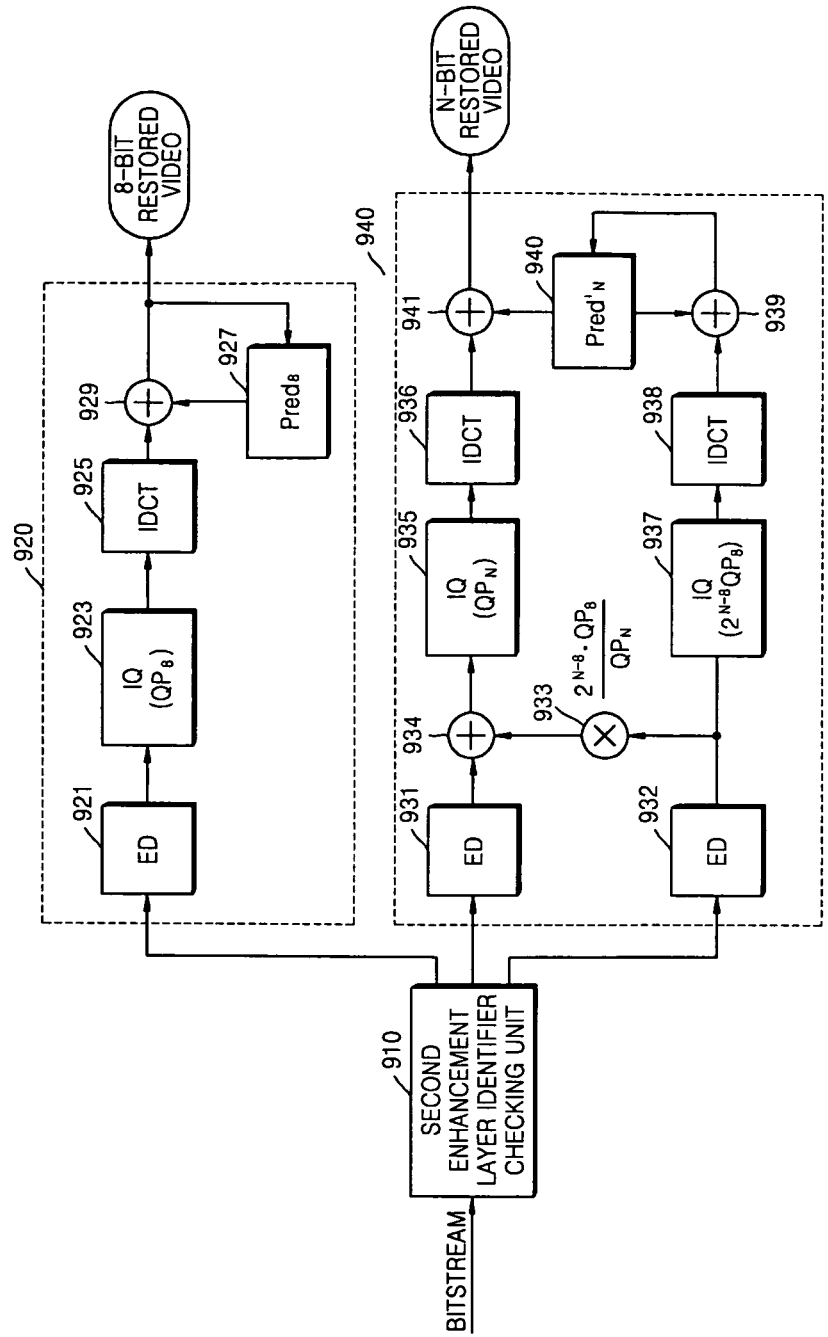
FIG. 9 is a block diagram illustrating a structure of a video decoding apparatus according to an embodiment.

FIG. 9 is a block diagram of a video decoding apparatus according to another embodiment of the present invention, which corresponds to the video encoding apparatus illustrated in FIG. 8. Referring to FIG. 9, the video decoding apparatus may include a second enhancement layer identifier checking unit 910, a second base layer decoding unit 920, and a second enhancement layer decoding unit 940. The second base layer decoding unit 920 may include a fourth entropy decoding unit 921, a fifth inverse quantization unit 923, a fifth inverse transformation unit 925, a fifth prediction unit 927 and a sixth addition unit 929. The second enhancement layer decoding unit 940 may include a fifth entropy decoding unit 931, a sixth entropy decoding unit 932, a fourth multiplication unit 933, a seventh addition unit 934, a sixth inverse quantization unit 935, a sixth inverse transformation unit 936, a seventh inverse quantization unit 937, a seventh inverse transformation unit 938, an eighth addition unit 939, a sixth prediction unit 940 and a ninth addition unit 941. The second enhancement layer identifier checking unit 910, the second base layer decoding unit 920, and the second enhancement layer decoding unit 940 may be implemented by using at least one processor (not shown).

Compared to the video decoding apparatus illustrated in FIG. 6, the video decoding apparatus illustrated in FIG. 9 performs temporal/spatial prediction using restored reference video by using an 8-bit quantization parameter.

Figure 10A:
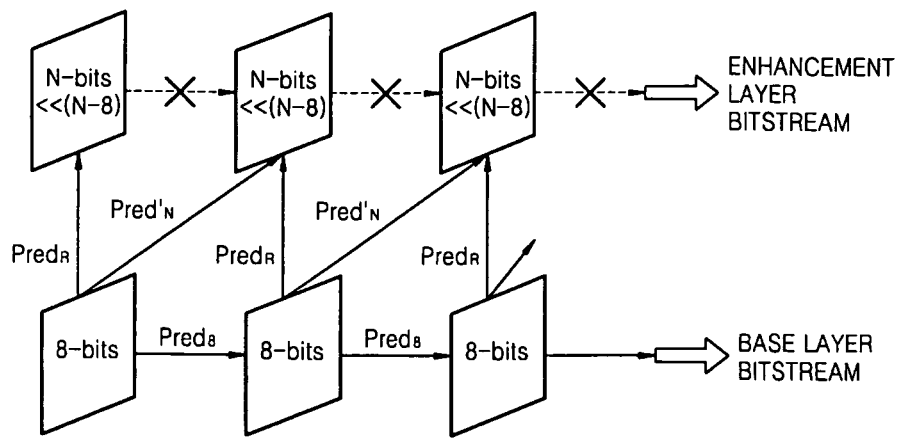
FIGS. 10A and 10B are diagrams illustrating an inter-layer prediction method or an intra-layer prediction method in the video encoding apparatus of FIGS. 8 and 9, according to an embodiment.
Figure 10B:
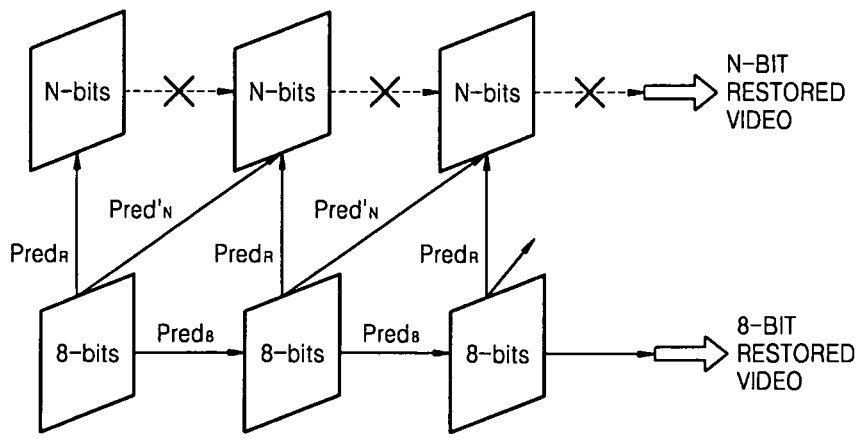

FIG. 10A is a diagram illustrating an inter-layer prediction method or an intra-layer prediction method using the video encoding apparatus illustrated in FIG. 8, according to another embodiment of the present invention. FIG. 10B is a diagram illustrating an inter-layer prediction method or an intra-layer prediction method using the video decoding apparatus illustrated in FIG. 9, according to another embodiment of the present invention. Unlike in FIGS. 7A and 7B, referring to FIGS. 10A and 10B, the encoding apparatus and the decoding apparatus use the same reference video in performing temporal/spatial prediction. Thus, the quality of restored video does not deteriorate in the case of 8-bit video but may deteriorate in the case of N-bit video.

Figure 11:
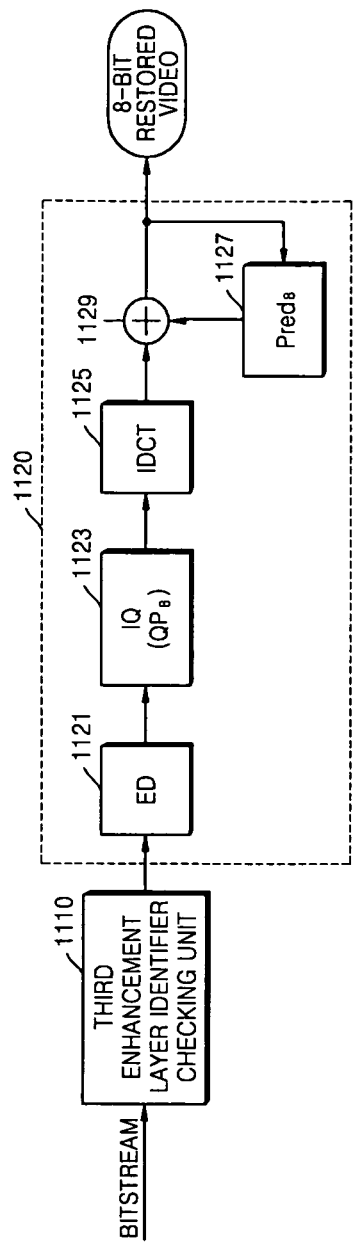
FIG. 11 is a block diagram of a VC-1 decoder for decoding a scalable bitstream which is generated according to an embodiment.

FIG. 11 is a block diagram of an improved VC-1 decoder for improved decoding a scalable bitstream according to an embodiment of the present invention. The VC-1 decoder includes a third enhancement layer identifier checking unit 1110 and a third base layer decoding unit 1120. The third base layer decoding unit 1120 includes a seventh entropy decoding unit 1121, an eighth inverse quantization unit 1123, an eighth inverse transformation unit 1125, a seventh prediction unit 1127 and a tenth addition unit 1129. The construction and operation of the third base layer decoding unit 1120 are the same as those of the first base layer decoding unit 620 illustrated in FIG. 6 and the second base layer decoding unit 920 illustrated in FIG. 9.

Referring to FIG. 11, the third enhancement layer identifier checking unit 1110 checks whether a bitstream contains an enhancement layer identifier, and directly provides the bitstream, i.e. the base layer bitstream, to the first base layer decoding unit 1120 if the bitstream does not contain the enhancement layer identifier. If the bitstream contains the enhancement layer identifier, the third enhancement layer identifier checking unit 1110 extracts only a base layer bitstream from the bitstream, i.e. the scalable bitstream and then provides the base layer bitstream to the first base layer decoding unit 1120.

Thus the improved VC-1 decoder of FIG. 11 can not only restore a bitstream received from a general VC-1 encoder but can also restore even a scalable bitstream by extracting only a base layer bitstream from the scalable bitstream, thereby providing forward compatibility.

The Motion-Compensated Discrete Cosine Transform (MC-DCT) video codec that has been extensively used in MPEG-2, MPEG-4, and H.264 is used in the above embodiments but the present invention is not limited thereto. That is, a modification or an addition may be made to the MC-DCT video codec according to application. Since the video codec used in the above embodiments is well known to those of ordinary skill in the art, a detailed description of the video codec, except for a modification or an addition to the video codec according to the present invention, has been omitted here.

In addition, in the embodiments described above, the supporting of two codecs in which a bit-depth is different is explained based on the example of the scalable bitstream formed by one base layer bitstream and one enhancement layer bitstream. However, the present invention can also support two or more codecs by using a plurality of enhancement layer bitstreams. Also, although the example of the bit-depth, in which the base bit-depth is smaller than the extended bit-depth, is explained in the above embodiments, the present invention can also be applied to a different conversion direction of the bit-depth, i.e., when the base bit-depth are greater than the extended bit-depth, in various ways of changing the design. Also, in the above embodiments, the refined QP (R) is allocated in the picture level, but when necessary, the refined QP (R) can be allocated in a slice level, a macroblock level, or a block level.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

As described above, according to one or more embodiments of the present invention, in order to provide a new video codec guaranteeing forward compatibility, a video encoder generates a scalable bitstream formed with a base layer bitstream and an enhancement layer bitstream. Then, a conventional base decoder which receives the scalable bitstream decodes the scalable bitstream, by using the base layer bitstream obtained from the scalable bitstream, and an improved decoder decodes the scalable bitstream, by using both the base layer bitstream and the enhancement layer bitstream. In this way, both the improved video codec and the conventional video code share the scalable bitstream in a harmonized way. More specifically, according to the present invention, a conventional Windows Media Video (WMV) codec or VC-1 codec can be used together with a new video codec supporting a new bit-depth and a new video format.

Thus, since the video codec according to the present invention provides the forward compatibility, the present invention can be applied to a variety of video codecs regardless of a supported bit-depth or video format, for example, to the conventional basic video codecs as well as improved video codecs mounted on a wired or wireless electronic device, such as a mobile phone, a DVD player, a portable music player, or a car stereo unit.

While aspects of the present invention has been particularly shown and described with reference to differing embodiments thereof, it should be understood that these exemplary embodiments should be considered in a descriptive sense only and not for purposes of limitation. Any narrowing or broadening of functionality or capability of an aspect in one embodiment should not considered as a respective broadening or narrowing of similar features in a different embodiment, i.e., descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A video encoding method of generating a scalable bitstream supporting at least two bit-depths with forward compatibility, wherein the scalable bitstream comprises:
    a base layer bitstream including a base quantization level and a base quantization parameter corresponding to a base bit-depth; and
    an enhancement layer bitstream including residue between an extended quantization level and a compensated quantization level that is predicted from the base quantization level, and a refined quantization parameter for compensating for the difference between an extended bit-depth and the base bit-depth, the refined quantization parameter being provided for generating an extended quantization parameter.

2. The method of claim 1, wherein the scalable bitstream further includes an enhancement layer identifier.

3. The method of claim 2, wherein the enhancement layer identifier is included in at least one of a sequence level, a group of pictures (GOP) level, a picture level, a macro block level, and a block level of the scalable bitstream.

4. The method of claim 2, wherein the enhancement layer identifier is included in a reserved area of the scalable bitstream.

5. The method of claim 1, wherein the base layer bitstream and the enhancement layer bitstream are generated using a predicted video obtained by performing temporal/spatial prediction using a restored video having the extended bit-depth as reference video.

6. The method of claim 1, wherein the base layer bitstream and the enhancement layer bitstream are generated using a predicted video obtained by performing temporal/spatial prediction using a restored video having the extended bit-depth, which is transformed from a restored video having the base bit-depth, as reference video.

7. A video encoding apparatus for generating a scalable bitstream supporting at least two bit-depths with forward compatibility, the video encoding apparatus comprising:
    a base layer encoding unit to generate a base layer bitstream including a base quantization level and a base quantization parameter corresponding to a base bit-depth;
    an enhancement layer encoding unit to generate an enhancement layer bitstream including residue between an extended quantization level and a compensated quantization level that is predicted from the base quantization level, and a refined quantization parameter for compensating for the difference between an extended bit-depth and the base bit-depth, the refined quantization parameter being provided for generating an extended quantization parameter; and
    a bitstream combining unit to combine the base layer bitstream and the enhancement layer bitstream to generate the scalable bitstream.

8. The apparatus of claim 7, wherein the scalable bitstream further includes an enhancement layer identifier.

9. The apparatus of claim 8, wherein the enhancement layer identifier is included in at least one of a sequence level, a group of pictures (GOP) level, a picture level, a macro block level, and a block level of the scalable bitstream.

10. The apparatus of claim 8, wherein the enhancement layer identifier is included in a reserved area of the scalable bitstream.

11. The apparatus of claim 7, wherein the base layer bitstream and the enhancement layer bitstream are generated using a predicted video obtained by performing temporal/spatial prediction using a restored video having the extended bit-depth as reference video.

12. The apparatus of claim 7, wherein the base layer bitstream and the enhancement layer bitstream are generated using a predicted video obtained by performing temporal/spatial prediction using a restored video having the extended bit-depth, which is transformed from a restored video having the base bit-depth, as reference video.

13. A video decoding apparatus comprising:
a base layer decoding unit to decode a base layer bitstream including a base quantization level and a base quantization parameter corresponding to a base bit-depth and to obtain a base restored video; and
an enhancement layer decoding unit to decode an enhancement layer bitstream including residue between an extended quantization level and a compensated quantization level that is predicted from the base quantization level, and a refined quantization parameter for compensating for the difference between an extended bit-depth and the base bit-depth, the refined quantization parameter being provided for generating an extended quantization parameter, and to obtain an extended restored video by adding a compensated quantization level predicted from a restored base quantization level to the residue.

14. The apparatus of claim 13, wherein the enhancement layer bitstream is decoded using a predicted video obtained by performing temporal/spatial prediction using a restored video having the extended bit-depth as reference video.

15. The apparatus of claim 13, wherein the enhancement layer bitstream is decoded using a predicted video obtained by performing temporal/spatial prediction using a restored video having the extended bit-depth, which is transformed from a restored video having the base bit depth as reference video.

16. The apparatus of claim 13 further comprising an enhancement layer identifier checking unit to check whether the scalable bitstream includes an enhancement layer identifier.

17. The apparatus of claim 16, wherein the enhancement layer identifier is included in at least one of a sequence level, a group of pictures (GOP) level, a picture level, a macro block level, and a block level of the scalable bitstream.

18. The apparatus of claim 16, wherein the enhancement layer identifier is included in a reserved area of the scalable bitstream.

19. A video decoding method comprising:
checking whether a bitstream contains an enhancement layer identifier;
if the bitstream does not contain the enhancement layer identifier, generating a restored video having a base bit-depth by decoding the bitstream; and
if the bitstream contains the enhancement layer identifier, generating a restored video having an extended bit-depth by decoding a residue between an extended quantization level and a compensated quantization level that is predicted from a base quantization level, and a refined quantization parameter for compensating for the difference between an extended bit-depth and the base bit-depth, the refined quantization parameter being provided for generating an extended quantization parameter, and adding the residue to the compensated quantization level obtained from at least a base quantization level and the extended quantization parameter.

20. The method of claim 19, wherein the enhancement layer bitstream is decoded using a predicted video obtained by performing temporal/spatial prediction using a restored video having the extended bit-depth as reference video.

21. The method of claim 19, wherein the enhancement layer bitstream is decoded using a predicted video obtained by performing temporal/spatial prediction using a restored video having the extended bit-depth, which is transformed from a restored video having the base bit depth as reference video.

22. The method of claim 19 further comprising an enhancement layer identifier checking unit to check whether the scalable bitstream includes an enhancement layer identifier.

23. The method of claim 19, wherein the enhancement layer identifier is included in at least one of a sequence level, a group of pictures (GOP) level, a picture level, a macro block level, and a block level of the scalable bitstream.

24. The method of claim 19, wherein the enhancement layer identifier is included in a reserved area of the scalable bitstream.

* * * * *